US012627027B2

(12) United States Patent
Yu et al.

(10) Patent No.: US 12,627,027 B2
(45) Date of Patent: May 12, 2026

(54) ANTENNA DEVICE AND ELECTRONIC DEVICE COMPRISING SAME

(71) Applicant: SAMSUNG ELECTRONICS CO., LTD., Suwon-si (KR)

(72) Inventors: Yeonsik Yu, Suwon-si (KR); Sungjae Kim, Suwon-si (KR); Hoyong Kim, Suwon-si (KR); Sanguk Park, Suwon-si (KR); Jongwan Shim, Suwon-si (KR); Jeongnam Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/642,136

(22) Filed: Apr. 22, 2024

(65) Prior Publication Data

US 2024/0275022 A1 Aug. 15, 2024

Related U.S. Application Data

(63) Continuation of application No. PCT/KR2022/016451, filed on Oct. 26, 2022.

(30) Foreign Application Priority Data

Oct. 26, 2021 (KR) ........................ 10-2021-0143581

(51) Int. Cl.
*H01Q 1/22* (2006.01)

(52) U.S. Cl.
CPC ..................................... *H01Q 1/22* (2013.01)

(58) Field of Classification Search
CPC ............ H01Q 1/22; H01Q 1/243; H01Q 1/38; H01Q 9/26; H01Q 13/24; H01Q 9/42
See application file for complete search history.

(56) References Cited

U.S. PATENT DOCUMENTS

| | | | | |
|---|---|---|---|---|
| 2,822,542 A * | 2/1958 | Butterfield | H01Q 13/20 343/705 |
| 3,623,112 A * | 11/1971 | Rupp | H01Q 21/062 343/768 |

(Continued)

FOREIGN PATENT DOCUMENTS

| | | | |
|---|---|---|---|
| DE | 10025262 A1 * | 8/2001 | H01Q 9/285 |
| JP | 2007151071 A | 6/2007 | |

(Continued)

OTHER PUBLICATIONS

International Search Report for PCT/KR2022/016451, mailed Feb. 6, 2023, 7 pages.

(Continued)

*Primary Examiner* — Dameon E Levi
*Assistant Examiner* — Jordan E. DeWitt
(74) *Attorney, Agent, or Firm* — Nixon & Vanderhye P.C.

(57) ABSTRACT

An antenna device according to an embodiment may comprise: a substrate portion; a first via pad configured to provide a power supply signal to a radiation member comprising a radiator; a second via pad configured to provide a ground to the radiation member; the radiation member being connected to the first via pad and the second via pad; and a radiation guide portion formed of a dielectric extending from the substrate portion in a lateral direction of the substrate portion and configured to guide a beam emitted from the radiation member, thereby directing the beam in the lateral direction.

16 Claims, 16 Drawing Sheets

(56) References Cited

U.S. PATENT DOCUMENTS

| | | | | | |
|---|---|---|---|---|---|
| 11,217,894 | B2 * | 1/2022 | Chou | H01Q 25/001 | |
| 2003/0080822 | A1 * | 5/2003 | Tzsuang | H01P 5/107 | 333/21 R |
| 2005/0276058 | A1 * | 12/2005 | Romas | B60Q 1/2665 | 362/494 |
| 2012/0056776 | A1 | 3/2012 | Shijo et al. | | |
| 2013/0169499 | A1 | 7/2013 | Lin et al. | | |
| 2014/0287702 | A1 | 9/2014 | Schuppener et al. | | |
| 2016/0043470 | A1 | 2/2016 | Ko et al. | | |
| 2017/0222323 | A1 * | 8/2017 | Brown | H01Q 1/3233 | |
| 2019/0173176 | A1 | 6/2019 | Kim et al. | | |
| 2020/0381830 | A1 | 12/2020 | Kim et al. | | |
| 2020/0381835 | A1 | 12/2020 | Chou et al. | | |
| 2021/0249774 | A1 | 8/2021 | Hong | | |
| 2021/0305673 | A1 * | 9/2021 | Ohlsson | H01P 5/107 | |
| 2024/0275022 | A1 * | 8/2024 | Yu | H01Q 1/22 | |

FOREIGN PATENT DOCUMENTS

| | | | |
|---|---|---|---|
| JP | 2012054869 | A | 3/2012 |
| JP | 2016-082247 | | 5/2016 |
| JP | 2016082247 | A * | 5/2016 |
| KR | 20100059076 | A | 6/2010 |
| KR | 20100136746 | A | 12/2010 |
| KR | 20160016465 | A | 2/2016 |
| KR | 20170004634 | A | 1/2017 |
| KR | 20190065112 | A | 6/2019 |
| KR | 20190067714 | A | 6/2019 |
| KR | 20190090441 | A | 8/2019 |
| KR | 20200112579 | A | 10/2020 |
| KR | 20210016055 | A | 2/2021 |

OTHER PUBLICATIONS

Written Opinion of the ISA for PCT/KR2022/016451, mailed Feb. 6, 2023, 4 pages.

Extended European Search Report dated Nov. 26, 2024 issued in European Patent Application No. 22887599.3.

Rousstia et al.,"Switched-beam array of dielectric rod antenna with RFMEMS switch for millimeterwave applications", AGU Publications, dated Mar. 12, 2015, 14 pages.

Korean Office Action dated Oct. 30, 2025 for KR Application No. 10-2021-0143581.

* cited by examiner

ANTENNA DEVICE AND ELECTRONIC DEVICE COMPRISING SAME

CROSS-REFERENCE TO RELATED APPLICATIONS

This application is a continuation of International Application No. PCT/KR2022/016451 designating the United States, filed on Oct. 26, 2022, in the Korean Intellectual Property Receiving Office and claiming priority to Korean Patent Application No. 10-2021-0143581, filed on Oct. 26, 2021, in the Korean Intellectual Property Office, the disclosures of each of which are incorporated by reference herein in their entireties.

BACKGROUND

Field

The disclosure relates to an antenna device and an electronic device including the same.

Description of Related Art

Wireless communication technology is implemented in various ways, such as wireless local area network (w-LAN) represented by Wi-Fi technology, Bluetooth, and near field communication (NFC). Mobile communication services are evolving from $1^{st}$ generation mobile communication services centered on voice calls to $5^{th}$ generation mobile communication networks. The $5^{th}$ generation mobile communication networks may provide mobile communication services in a ultra-high frequency band of tens of GHz (hereinafter, referred to as "millimeter-wave (mm-Wave) communication").

An antenna device used for wireless communication (e.g., mm-Wave communication) may be implemented on a portion (the periphery) of a circuit board (e.g., a printed circuit board (PCB)), thereby securing antenna radiation performance and overcoming the constraints of a mounting space.

When an antenna device used for wireless communication (e.g., millimeter-Wave communication) is implemented on a circuit board including a dielectric (e.g., a flame retardant 4 (FR4) dielectric), a deviation in the dielectric permittivity (or "dielectric constant") of the dielectric may cause a deviation in frequency resonance, and an antenna gain may be decreased by a high dielectric dissipation factor.

SUMMARY

Embodiments of the disclosure provide an antenna device and an electronic device including the same, which may maintain user-desired communication band characteristics and prevent and/or reduce the decrease of an antenna gain which might otherwise be caused by a high dielectric dissipation factor, even in the presence of a deviation in the dielectric permittivity of a dielectric.

An antenna device according to an example embodiment of the disclosure includes: a board unit including a printed circuit board, a first via pad configured to provide a feed signal to a radiation member including a radiator, a second via pad configured to provide a ground to the radiation member, the radiation member connected to the first via pad and the second via pad, and a radiation guide unit formed of a dielectric extending from the board unit in a lateral direction of the board unit, and configured to guide a beam emitted from the radiation member in the lateral direction.

An antenna device according to an example embodiment of the disclosure includes: a board unit comprising a printed circuit board, a radiation member including a radiator, and a radiation guide unit formed of a dielectric extending from the board unit, and configured to guide a beam emitted from the radiation member in a direction in which a top surface or a bottom surface of the board unit faces.

An electronic device according to an example embodiment includes a wireless communication module comprising wireless communication circuitry configured to support millimeter wave communication, at least one processor, comprising processing circuitry, and an antenna device. The antenna device includes: a board unit comprising a printed circuit board, a first via pad configured to provide a feed signal to a radiation member including an antenna, a second via pad configured to provide a ground to the radiation member, the radiation member connected to the first via pad and the second via pad, and a radiation guide unit formed of a dielectric extending from the board unit in a lateral direction of the board unit, and configured to guide a beam emitted from the radiation member in the lateral direction.

An antenna device and an electronic device including the same according to various example embodiments of the disclosure may maintain user-desired communication band characteristics and prevent and/or reduce the decrease of an antenna gain which might otherwise be caused by a high dielectric dissipation factor, even in the presence of a deviation in the dielectric permittivity of a dielectric.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
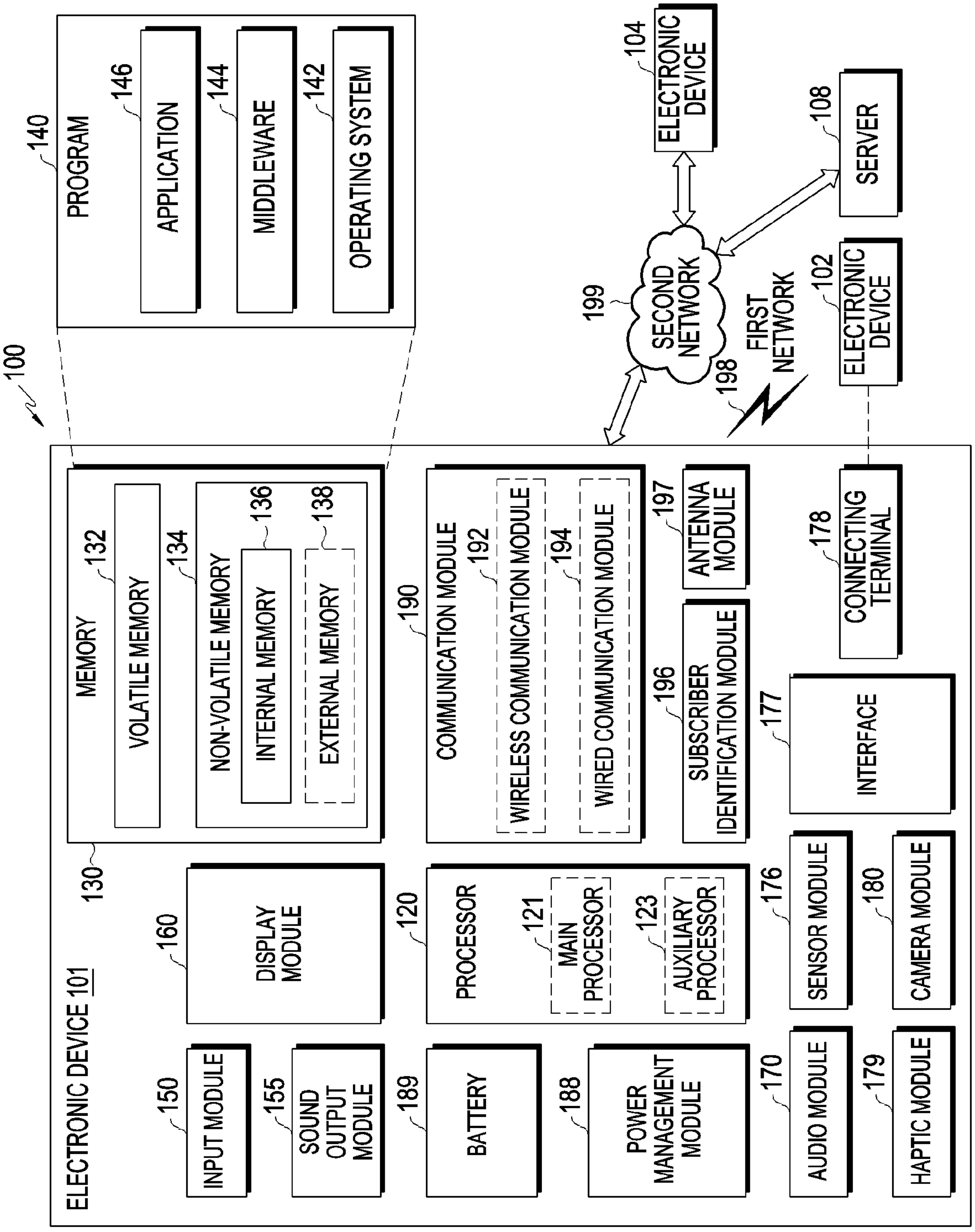
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “$1^{st}$” and “$2^{nd}$”, or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
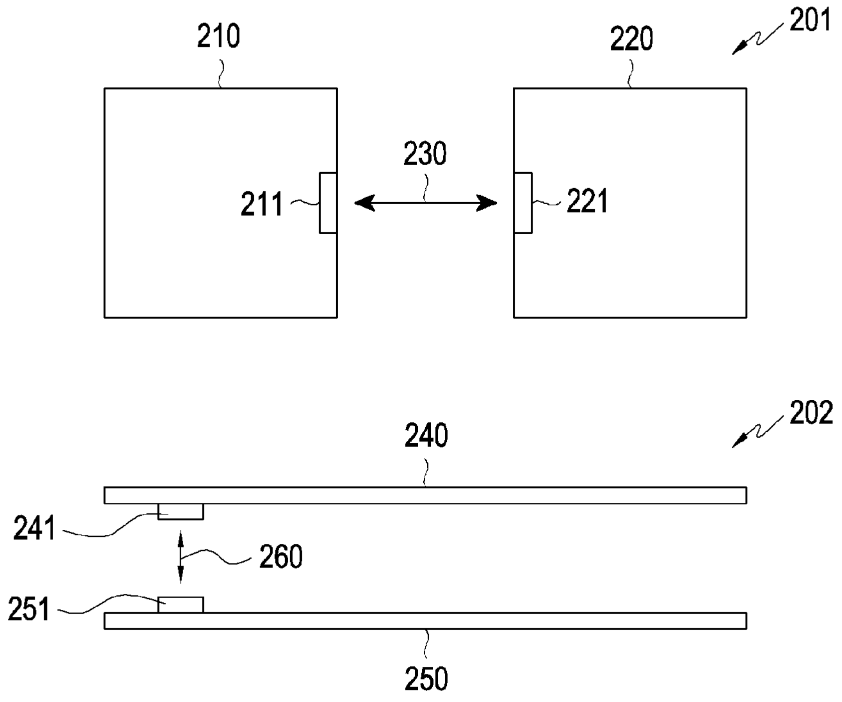
FIG. 2 is a diagram illustrating an example method of communication between antenna devices according to various embodiments.

FIG. 2 is a diagram illustrating an example method of communication between antenna devices according to various embodiments.

Referring to FIG. 2, in an embodiment, an antenna device may be implemented on a circuit board (e.g., a PCB). For example, the antenna device may include at least one antenna on board (AOB) implemented on the periphery of the circuit board (e.g., an outermost or outer portion of the circuit board) and/or within the circuit board.

In an embodiment, the antenna device may perform wireless communication (e.g., millimeter-wave communication) in a direction in which a side surface of the antenna device faces. For example, a first radiation member 211 may be disposed on a side surface of a first antenna device 210 (e.g., an outermost or outer portion of the first antenna device 210), and a second radiation member 221 may be disposed on a side surface of a second antenna device 220, as indicated by reference numeral 201. With the side surface of the first antenna device 210 facing the side surface of the second antenna device 220, the first antenna device 210 and the second antenna device 220 may perform wireless communication 230 via the first radiation member 211 and the second radiation member 221. In an embodiment, in reference numeral 201, the first antenna device 210 and the second antenna device 220 may be components included in the electronic device 101, which should not be construed as limiting. The first antenna device 210 may be a component included in the electronic device 101, and the second antenna device 220 may be a component included in another electronic device (e.g., the electronic device 102 or the electronic device 104). The structure of an antenna device for performing wireless communication in a direction in which a side surface of the antenna device faces will be described in greater detail below with reference to FIGS. 3 to 7C.

In an embodiment, the antenna device may perform wireless communication in a direction in which a surface of the antenna device (e.g., a top or bottom surface of the antenna device) faces. For example, a third radiation member 241 may be disposed on a bottom surface of a third antenna device 240 (e.g., an area including a portion of the bottom surface of the third antenna device 230), and a fourth radiation member 251 may be disposed on a top surface of a fourth antenna device 250 (e.g., an area including a portion of the top surface of the fourth antenna device 250), as indicated by reference numeral 202. With the bottom surface of the third antenna device 240 facing the top surface of the fourth antenna device 250, the third antenna device 240 and the fourth antenna device 250 may perform wireless communication 260 via the third radiation member 241 and the fourth radiation member 251. In an embodiment, in reference numeral 202, the third antenna device 240 and the fourth antenna device 250 may be components included in the electronic device 101, which should not be construed as limiting. The third antenna device 240 may be a component included in the electronic device 101, and the fourth antenna device 250 may be a component included in another electronic device (e.g., the electronic device 102 or the electronic device 104). The structure of an antenna device for performing wireless communication in a direction in which a surface of the antenna device (e.g., a top or bottom surface of the antenna device faces will be described in greater detail below with reference to FIGS. 8 to 11B.

Figure 3:
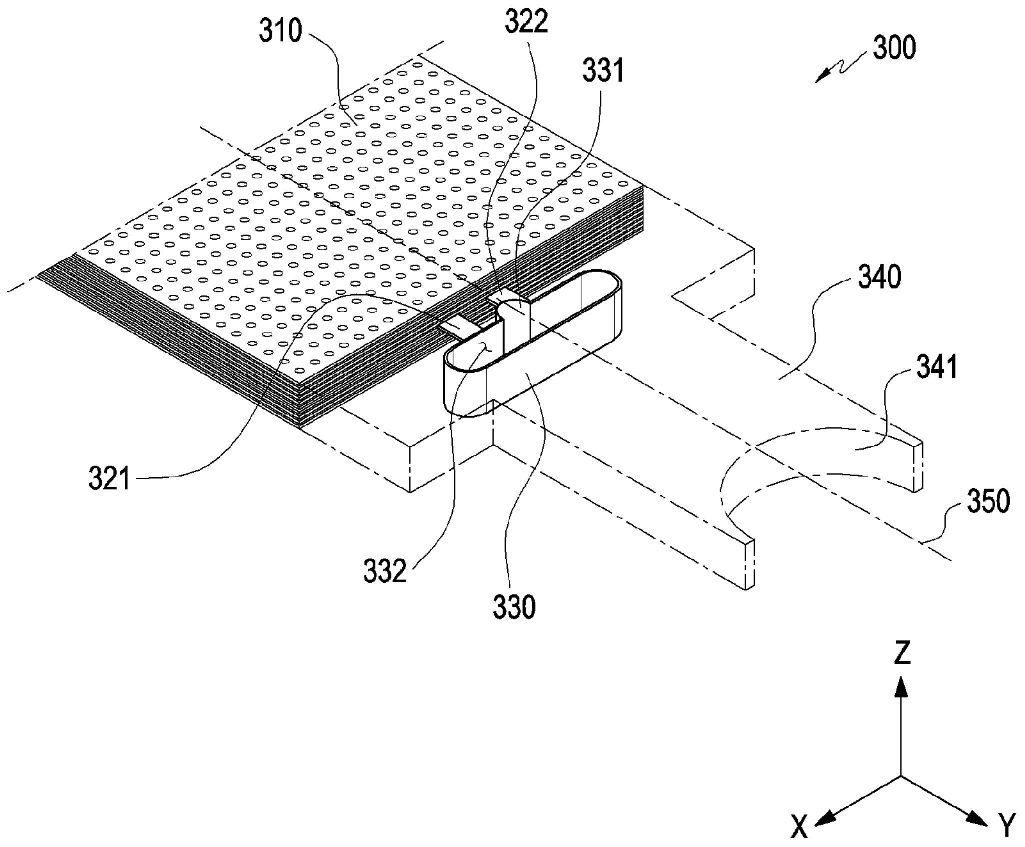
FIG. 3 is a perspective view illustrating an example antenna device according to various embodiments.

FIG. 3 is a perspective view 300 illustrating an antenna device according to various embodiments.

Figure 4:
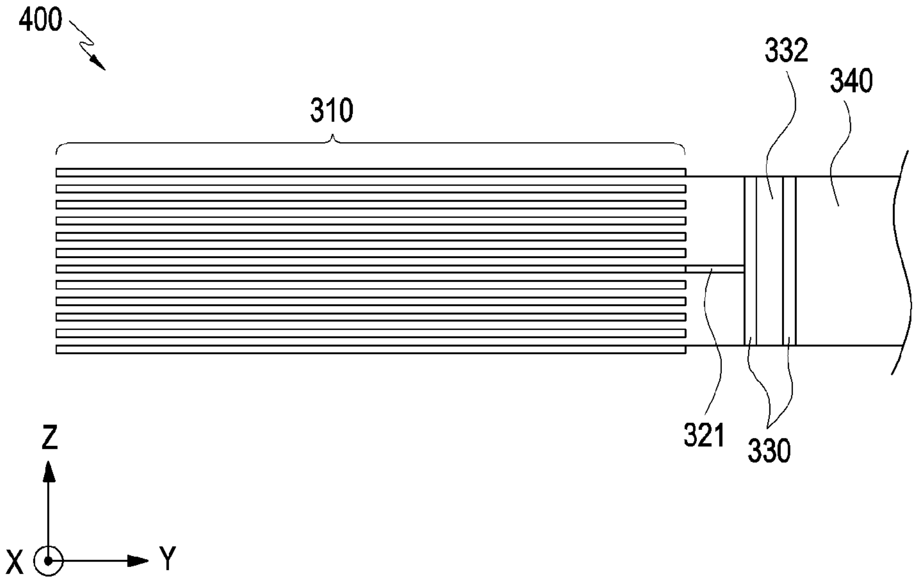
FIG. 4 is a diagram illustrating a side view of an antenna device according to various embodiments.

FIG. 4 is a diagram illustrating a side view 400 of an antenna device according to various embodiments.

Referring to FIGS. 3 and 4, in an embodiment, FIG. 3 may be a diagram illustrating a portion of the antenna device, and FIG. 4 may be a diagram illustrating a cross-section of a portion of the antenna device illustrated FIG. 3, taken along a line 350.

In an embodiment, the antenna device may include a board unit 310, a first via pad 321 providing a feed signal to a radiation member 330, a second via pad 322 providing a ground to the radiation member 330, the radiation member 330, and/or a radiation guide unit 340.

In an embodiment, the board unit 310, which is a stack of a plurality of layers, may include a flexible PCB and a dielectric substrate. In an embodiment, at least some of the plurality of layers included in the board unit 310 may include printed circuit patterns formed of a conductor, a ground unit (e.g., a ground layer), and a plurality of via holes formed through front/rear (or top/bottom) surfaces thereof. In an embodiment, the plurality of via holes may be formed to electrically connect printed circuit patterns formed on different layers to each other or for heat dissipation. In an embodiment, while not shown in FIGS. 3 and 4, the board unit 310 may further include a feeding unit (e.g., a communication circuit or a radio frequency integrated circuit (RF IC)), a feeding line transmitting a feed signal from the feeding unit to the radiation member 330, and a ground line providing a ground from the ground unit to the radiation member 330.

In an embodiment, the first via pad 321 may provide a feed signal to the radiation member 330. For example, the first via pad 321 may be connected to one or more of the plurality of holes included in the board unit 310 and transmit the feed signal from the feeding unit included in the board unit 310 (e.g., disposed on the board unit 310) to the radiation member 330. In an embodiment, the first via pad 321 may be a portion of the feeding line transmitting the feed signal from the feeding unit to the radiation member 330.

In an embodiment, the second via pad 322 may provide the ground to the radiation member 330. For example, the second via pad 322 may be connected to one or more of the plurality of holes included in the board unit 310 and provide the ground from the ground unit to the radiation member 330. In an embodiment, the second via pad 322 may be a portion of the ground line that provides the ground from the ground unit to the radiation member 330.

In an embodiment, as the antenna device includes the first via pad 321 and the second via pad 322, the antenna device may provide the feed signal and the ground from the board unit 310 (e.g., the feeding unit and the ground unit) to the radiation member 330, even without a separate connecting member.

In an embodiment, the radiation member 330 (also referred to as a "radiator") may include, for example, a folded dipole antenna. For example, the radiation member 330 may have one end connected to the first via pad 321 and the other end connected to the second via pad 322.

In an embodiment, the radiation member 330 may be implemented in the form of a via wall comprising an elongated hole 332 in a closed-loop shape within a dielectric (e.g., a dielectric of which the radiation guide unit 340 is formed) and plating the formed elongated hole 332. In an embodiment, the radiation member 330 may be implemented as a folded dipole antenna by removing a portion between the first via pad 321 and the second via pad 322 within a surface of the via wall in the form of a closed loop. For example, the radiation member 330 may be implemented as a folded dipole antenna by removing a portion of the via wall such that a via hole 331 is formed in the portion between the first via pad 321 and the second via pad 322 within the surface of the via wall in the form of a closed loop (e.g., such that the first via pad 321 and the second via pad 322 are not directly connected). A more detailed description of the process of forming the radiation member 330 will be described later with reference to FIGS. 5A to 5C.

In an embodiment, the radiation member 330 may be spaced apart from the board unit 310 by a specified distance to minimize and/or reduce any effects related to radiation performance caused by components (e.g., the printed circuit patterns) included in the board unit 310.

In an embodiment, the height of the radiation member 330 (e.g., the height of the via wall forming the radiation member 330) may be substantially equal to the height of the board unit 310. As the radiation member 330 is implemented such that the height of the radiation member 330 is substantially equal to the height of the board unit 310, an effective area and radiation resistance may increase, thereby improving the broadband characteristics of a communication signal. However, the radiation member 330 may also be implemented such that the height of the radiation member 330 is less than or greater than the height of the board unit 310.

In an embodiment, as the radiation member 330 may be implemented as a folded dipole antenna in which the height of the radiation member 330 is substantially equal to the height of the board unit 310, broadband communication signals are available, and antenna performance in a desired band may be maintained even in the presence of a deviation in the dielectric permittivity of a dielectric included in the antenna device (e.g., a dielectric of which a portion of a circuit board is formed) (e.g., even in the presence of a dielectric permittivity deviation between dielectrics for implementing the circuit board).

In an embodiment, the radiation guide unit 340 may include a dielectric (e.g., a flame retardant 4 (FR4) dielectric) extending from the board unit 310 in a lateral direction (e.g., a Y-axis direction) of the board unit 310.

In an embodiment, the radiation guide unit 340 may be implemented by machining a dielectric surrounding the radiation member 330 into the shape of a waveguide (e.g., a rectangular waveguide). For example, the radiation guide unit 340 may be implemented in the form of a waveguide in which the dielectric extends in the lateral direction (e.g., the Y-axis direction) of the board unit 310, by removing a portion of the dielectric surrounding the radiation member 330.

In an embodiment, the radiation guide unit 340 may guide a beam emitted from the radiation member 330 to be directed in the lateral direction (e.g., the Y-axis direction) of the board unit 310. For example, as components (e.g., the printed circuit patterns, the ground unit, and the plurality of via holes) included in the board unit 310 act as reflectors, the beam emitted from the radiation member 330 may be directed in the lateral direction of the board unit 310 (e.g., in the Y-axis direction or in an end-fire direction of the radiation member 330). The radiation guide unit 340 may guide the beam reflected by the components included in the board unit 310 (and the beam emitted from the radiation member 330) to be directed in the lateral direction of the board unit 310.

In an embodiment, because the radiation guide unit 340 guides a beam emitted from the radiation member 330 to be directed in a specific direction (e.g., in the lateral direction of the board unit 310), energy related to the beam emitted from the radiation member 330 may be collected in the specific direction, thereby increasing the gain of a signal and a communication distance.

In an embodiment, an end portion 341 of the radiation guide unit 340 may be in the shape of a semi-ellipse. In an embodiment, a beam emitted from the radiation member 330 may be directed in a specific direction (e.g., in the Y-axis direction or the end-fire direction of the radiation member 330) by implementing the end portion 341 of the waveguide-shaped radiation guide unit 340 in the shape of a semi-ellipse.

In an embodiment, the semi-elliptical shape of the end portion 341 of the radiation guide unit 340 may be convex or concave to direct the emitted beam in the specific direction. Further, the end portion 341 of the radiation guide unit 340 may be implemented in any other shape, not limited to an elliptical shape.

Figure 5A:
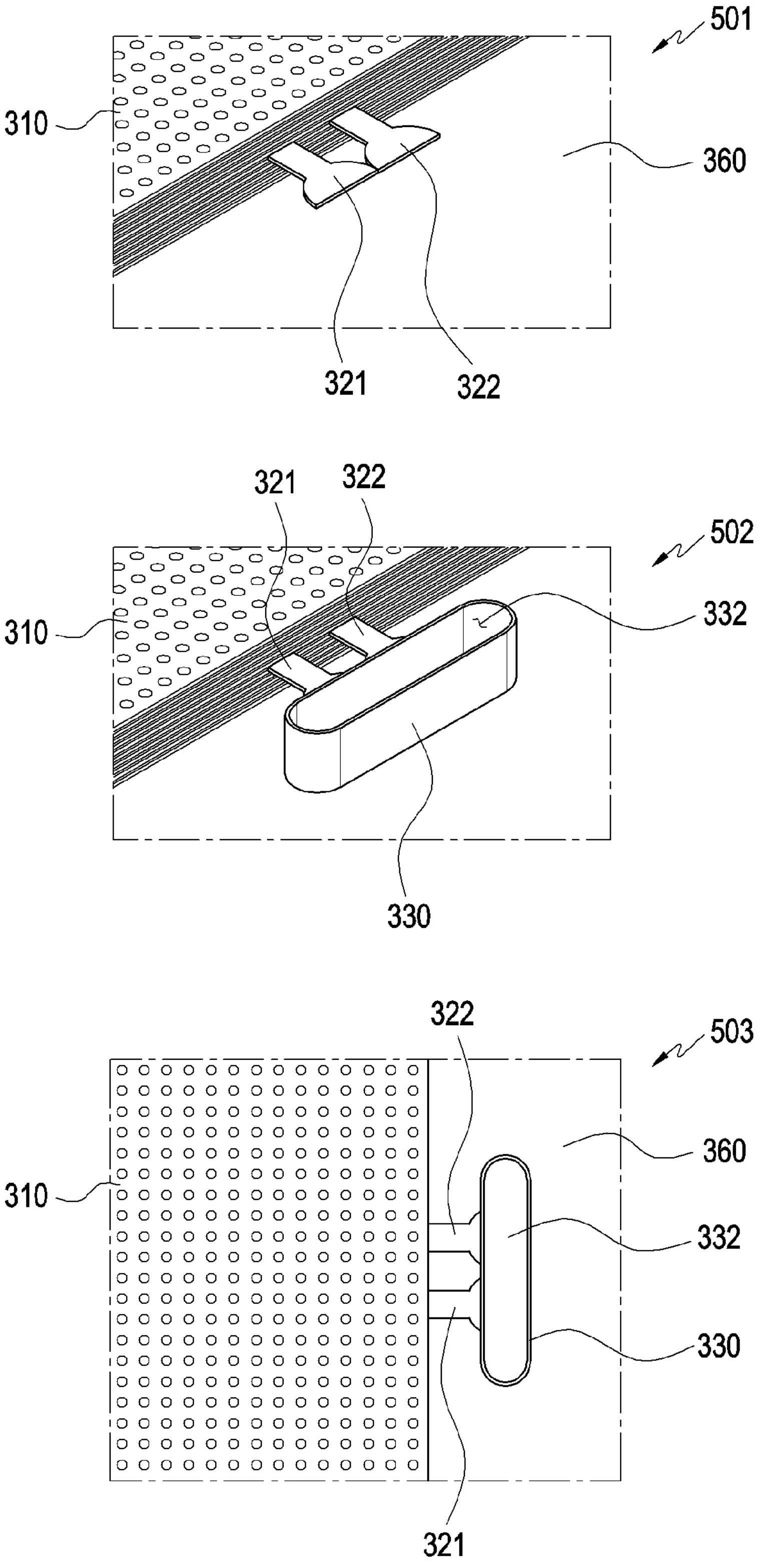
FIGS. 5A, 5B, and 5C are diagrams and perspective views illustrating an example method of implementing an antenna device according to various embodiments.
Figure 5B:
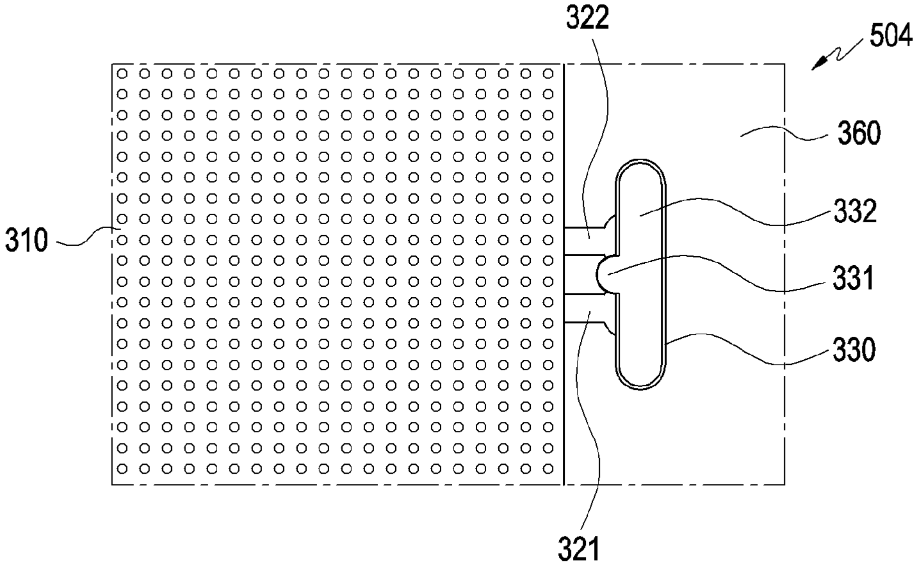
Figure 5C:
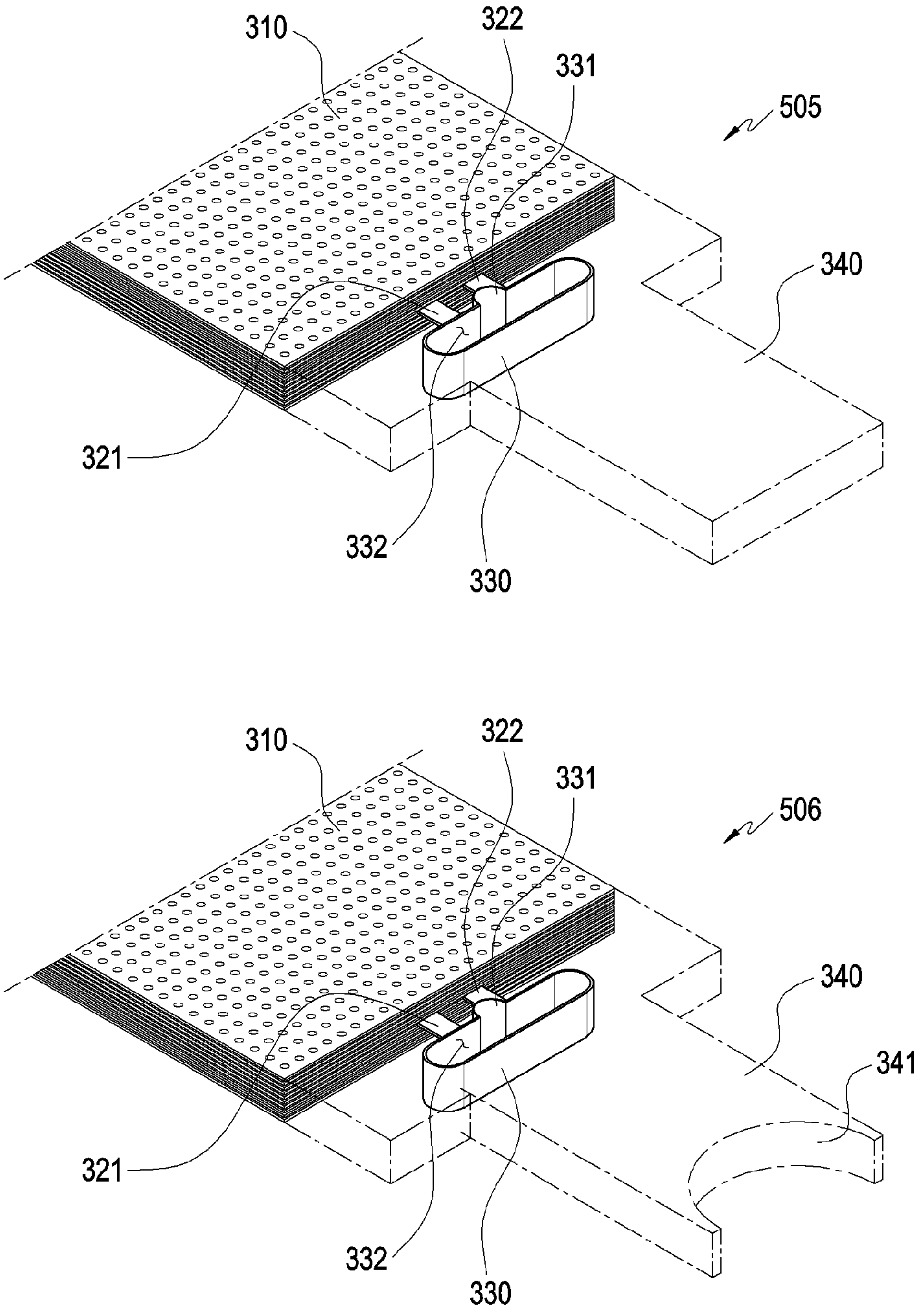

FIGS. 5A, 5B, and 5C are perspective views illustrating an example method of implementing an antenna device according to various embodiments.

Referring to FIGS. 5A, 5B, and 5C (which may be referred to as FIGS. 5A to 5C), in an embodiment, FIGS. 5A to 5C may be diagrams illustrating a process of fabricating an antenna device from a circuit board (e.g., a PCB) according to various embodiments.

In reference numeral 501, the first via pad 321 and the second via pad 322 may be formed in an embodiment. For example, the first via pad 321 providing a feed signal to the radiation member 330 and the second via pad 322 providing a ground to the radiation member 330 may be formed during formation of the board unit 310 and a dielectric 360. In an embodiment, the board unit 310 (e.g., a dielectric substrate) may include a plurality of layers. The plurality of layers may include printed circuit patterns formed of a conductor, a ground unit (e.g., a ground layer), and a plurality of via holes formed through the front/rear (or top/bottom) surfaces thereof. In an embodiment, the dielectric 360 may extend from the board unit 310 in the lateral direction of the board unit 310. The first via pad 321 and the second via pad 322 may be disposed between the plurality of layers and implemented to be connected to one or more of the plurality of via holes formed on the plurality of layers.

In an embodiment, each of a portion of the first via pad 321 to be connected to the radiation member 330 and a portion of the second via pad 322 to be connected to the radiation member 330 may be implemented in the form of a semi-circle. For example, as indicated by reference numeral 501, an end portion of the first via pad 321 and an end portion of the second via pad 322 may each be implemented in the form of a semi-circle. In an embodiment, as each of the portion of the first via pad 321 to be connected to the radiation member 330 and the portion of the second via pad 322 to be connected to the radiation member 330 is implemented in the form of a semi-circle, some pattern of the first via pad 321 and some pattern of the pattern of the second via pad 322 may not remain, when the radiation member 330 is formed through elongated hole machining.

In reference numeral 502, in an embodiment, the elongated hole 332 in the form of a closed loop may be formed on the dielectric through elongated hole machining. For example, an elongated elliptical hole 332 may be formed within the dielectric 360 using a milling machine. In an embodiment, the elongated hole 332 in the form of a closed loop may be formed by performing elongated hole machining on a dielectric portion spaced apart from the board unit 310 by a specified distance, such that the plurality of via holes are continuously arranged in one direction and overlap each other.

In reference numeral 503, in an embodiment, after the elongated hole 332 is formed as indicated by reference numeral 502, the radiation member 330 having a via wall may be formed by plating an inner wall of the dielectric 360, which contacts the elongated hole 332. For example, copper plating may be performed on the inner wall of the dielectric 360 in contact with the elongated hole 332. In another example, plating may be performed on the dielectric 360 in contact with the elongated hole 332 using platinum as an additive, in addition to copper.

In an embodiment, elongated hole machining and plating may be performed such that the first via pad 321 and the second via pad 322 are connected to (e.g., contact) the radiation member 330 having the via wall, as indicated by reference numeral 502 and reference numeral 503.

In reference numeral 504, in an embodiment, a folded dipole antenna may be implemented by performing a via hole machining process on the radiation member 330 having the via wall formed in the form of an elongated elliptical closed loop. For example, the radiation member 330 may be implemented as a folded dipole antenna by removing a portion of the via wall formed in the form of an elongated elliptical closed loop, such that the via hole 331 is formed in a portion between the first via pad 321 and the second via pad 322 (e.g., a dielectric portion located between the first via pad 321 and the second via pad 322) (e.g., such that the first vid pad 321 is not directly connected to the second via pad 322)

In reference numeral 505, in an embodiment, the radiation guide unit 340 may be implemented by machining the dielectric 360 surrounding the radiation member 330 into the form of a waveguide (e.g., a rectangular waveguide). For example, the radiation guide unit 340 may be implemented in the form of a waveguide in which the dielectric extends in a lateral direction of the board unit 310, by removing a portion of the dielectric surrounding the radiation member 330.

In reference numeral 506, in an embodiment, the radiation guide unit 340 may be implemented such that the end portion 341 of the radiation guide member 340 has a semi-elliptical shape.

In an embodiment, FIGS. 2 to 5C illustrate the radiation member 330 and the radiation guide unit 340 formed on one side surface of the board unit 310 by way of example, which should not be construed as limiting. For example, a plurality of radiation members and a plurality of radiation guide units may be formed on a plurality of side surfaces of the board unit 310.

Figure 6:
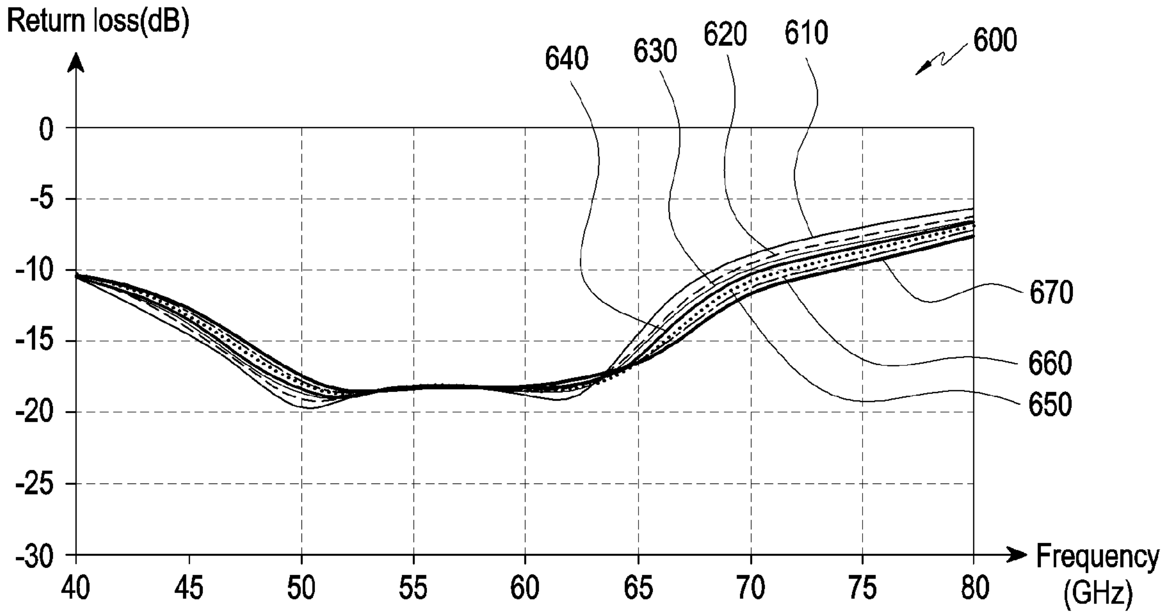
FIG. 6 is a graph illustrating radiation characteristics versus the dielectric permittivity of a dielectric in an antenna device according to various embodiments.

FIG. 6 is a graph 600 illustrating radiation characteristics versus the dielectric permittivity of a dielectric in an antenna device according to various embodiments.

Referring to FIG. 6, in an embodiment, a first line 610 in the graph may represent a return loss at a frequency (e.g., a resonant frequency), when a dielectric (e.g., the dielectric 360) included in the antenna device has a dielectric permittivity of 4.6 (F/m). For example, the first line 610 may represent a return loss according to a frequency, when a portion of the board unit 310 and the radiation guide unit 340 of the antenna device are formed of a dielectric with a dielectric permittivity of 4.6 (F/m). In the graph, a second line 620, a third line 630, a fourth line 640, a fifth line 650, a sixth line 660, and a seventh line 670 may represent a return loss according to a frequency, when the dielectric included in the antenna device has dielectric permittivities of 4.5, 4.4, 4.3, 4.2, 4.1, and 4.0 (F/m), respectively.

In an embodiment, the return losses on the first line 610 to the seventh line 670 (e.g., 610, 620, 630, 640, 650, 660 and 670) may be substantially equal in a specified frequency band (e.g., about 55 GHz to about 65 GHz) of millimeter-wave communication, as illustrated in FIG. 6.

In an embodiment, as the radiation member 330 of the antenna device is implemented as a folded dipole antenna in which the height of the radiation member 330 is substantially equal to the height of the board unit 310, broadband communication signals are available, and antenna performance in a desired band may be maintained even in the presence of a deviation in the dielectric permittivity (e.g., dielectric permittivities of 4.0 to 4.6 (F/m)) of a dielectric (e.g., a dielectric forming a portion of a circuit board) included in the antenna device (e.g., a dielectric permittivity deviation between dielectrics for implementing the circuit board).

Figure 7A:
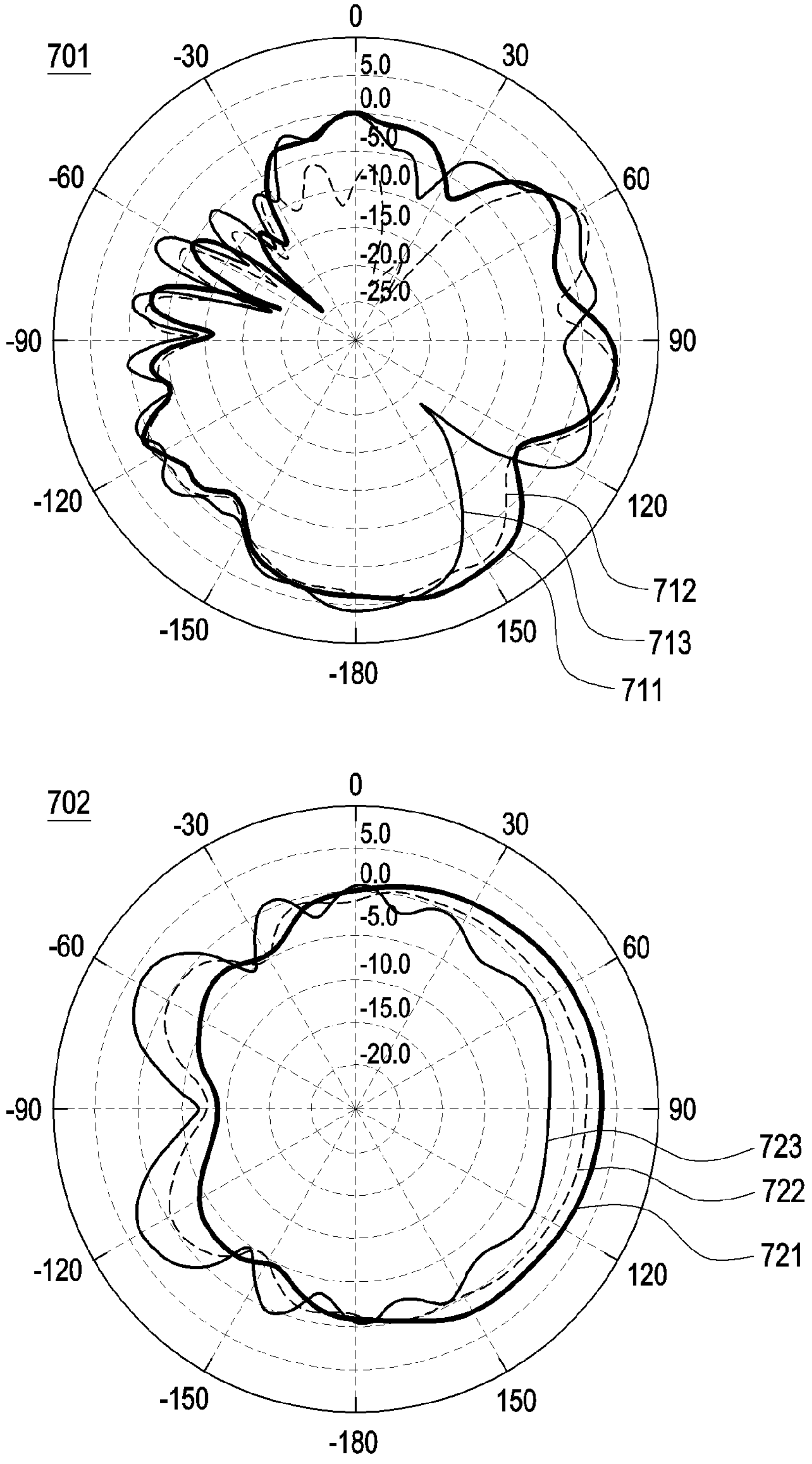
FIGS. 7A, 7B, and 7C are diagrams illustrating radiation patterns of an antenna device according to various embodiments
Figure 7B:
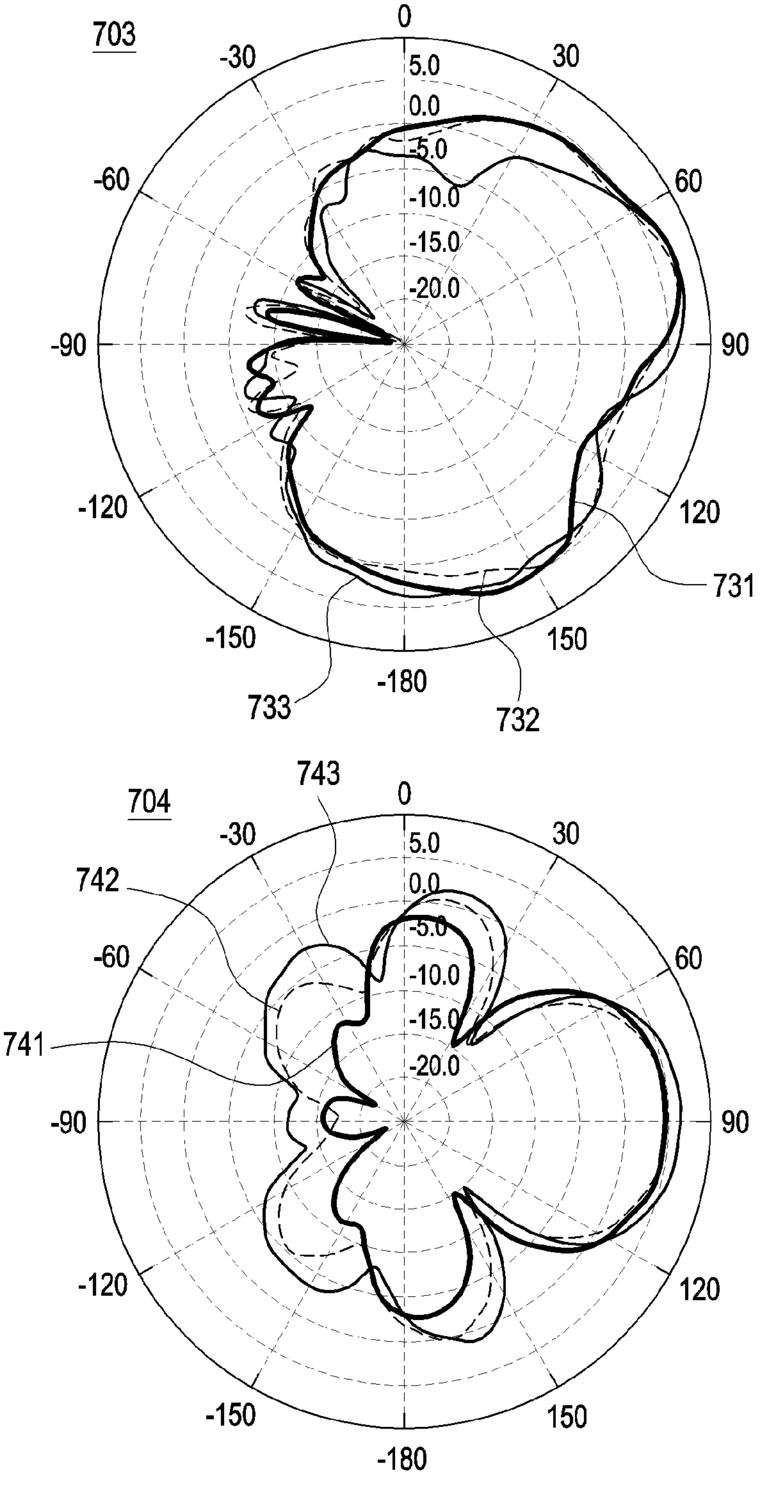
Figure 7C:
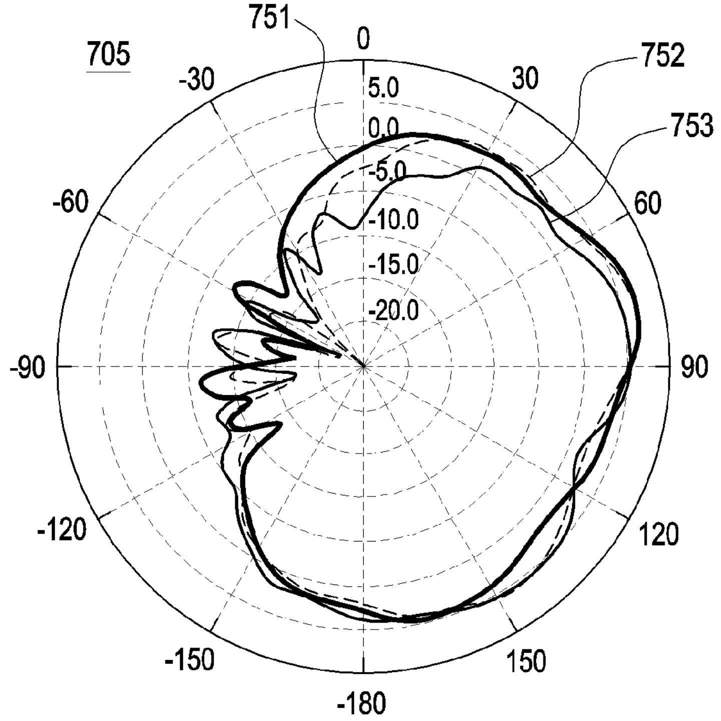
Figure 7C:
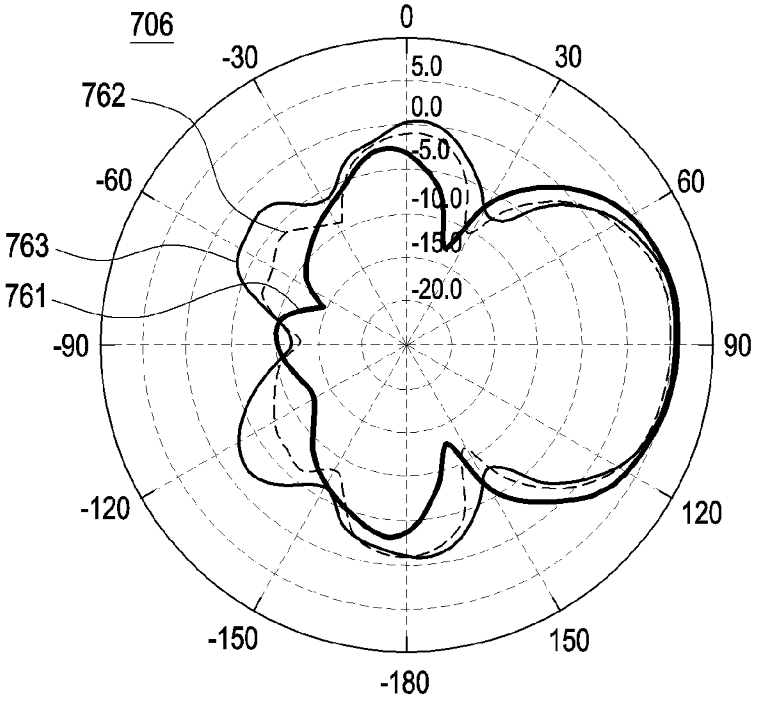

FIGS. 7A, 7B, and 7C are diagrams illustrating radiation patterns in an antenna device according to various embodiments.

Referring to FIGS. 7A, 7B, and 7C (which may be referred to as FIGS. 7A to 7C), in an embodiment, FIG. 7A may illustrate radiation patterns measured in an antenna device without the radiation guide unit 340. For example, FIG. 7A may illustrate radiation patterns measured in an antenna device in which the radiation guide unit 340 is not implemented, as indicated by reference numeral 504 in FIG. 5B.

In an embodiment, in reference numeral 701 of FIG. 7A, lines 711, 712, and 713 may represent radiation patterns formed in a horizontal direction of the antenna device (e.g., a direction facing a plane formed by the X axis and the Y axis. In reference numeral 701, a direction indicated by an angle of 90 may be the Y-axis direction of FIG. 3 (e.g., the lateral direction of the board unit 310).

In an embodiment, in reference numeral 702 of FIG. 7A, lines 721, 722, and 723 may represent radiation patterns formed in a vertical direction of the antenna device (e.g., a direction facing a plane formed by the Y axis and the Z axis in FIG. 3). In reference numeral 702, a direction indicated by an angle of 90 may be the Y-axis direction of FIG. 3 (e.g., the lateral direction of the board unit 310).

In an embodiment, the line 711 and the line 721 may represent radiation patterns formed at a frequency of about 55 GHz, the line 712 and the line 722 may represent radiation patterns formed at a frequency of about 60 GHz, and the line 713 and the line 723 may represent radiation patterns formed at a frequency of about 65 GHz.

In an embodiment, FIG. 7B may represent radiation patterns measured in an antenna device in which the end portion of the radiation guide unit 340 is implemented in a planar shape. For example, FIG. 7B may represent radiation patterns measured in an antenna device in which the end portion of the radiation guide unit 340 is implemented in a planar shape (e.g., the end portion of the radiation guide unit 340 is not implemented in an elliptical shape), as indicated by reference numeral 505 in FIG. 5C.

In an embodiment, in reference numeral 703 of FIG. 7B, lines 731, 732, and 733 may represent radiation patterns formed in the horizontal direction of the antenna device (e.g., the direction facing the plane formed by the X axis and Y axis in FIG. 3). In reference numeral 703, a direction indicated by an angle of 90 may be the Y-axis direction in FIG. 3 (e.g., the lateral direction of the board unit 310).

In an embodiment, in reference numeral 704 of FIG. 7B, lines 741, 742, and 743 may represent radiation patterns formed in the vertical direction of the antenna device (e.g., the direction facing the plane formed by the Y axis and the Z axis in FIG. 3). In reference numeral 704, a direction indicated by an angle of 90 may be the Y-axis direction in FIG. 3 (e.g., the lateral direction of the board unit 310).

In an embodiment, the line 731 and the line 741 may represent radiation patterns formed at a frequency of about 55 GHz, the line 732 and the line 742 may represent radiation patterns formed at a frequency of about 60 GHz, and the line 733 and the line 743 may represent radiation patterns formed at a frequency of about 65 GHz.

In an embodiment, FIG. 7C may represent radiation patterns measured in an antenna device in which the end portion of the radiation guide unit 340 is implemented in an elliptical shape. For example, FIG. 7C may represent radiation patterns measured in an antenna device in which the end portion of the radiation guide unit 340 is implemented in the elliptical shape (e.g., the end portion of the radiation guide unit 340 is implemented in an elliptical shape), as indicated by reference numeral 505 in FIG. 5C.

In an embodiment, in reference numeral 705 of FIG. 7C, lines 751, 752, and 753 may represent radiation patterns formed in the horizontal direction of the antenna device (e.g., the direction facing the plane formed by the X axis and Y axis in FIG. 3). In reference numeral 705, a direction indicated by an angle of 90 may indicate the Y-axis direction in FIG. 3 (e.g., the lateral direction of the board unit 310).

In an embodiment, in reference numeral 706 of FIG. 7C, lines 761, 762, and 763 may represent radiation patterns formed in the vertical direction of the antenna device (e.g., the direction facing the plane formed by the Y axis and the Z axis in FIG. 3). In reference numeral 706, a direction indicated by an angle of 90 may represent the Y-axis direction in FIG. 3 (e.g., the lateral direction of the board unit 310).

In an embodiment, the line 751 and the line 761 may represent radiation patterns formed at a frequency of about 55 GHz, the line 752 and the line 762 may represent radiation patterns formed at a frequency of about 60 GHz, and the line 753 and the line 763 may represent radiation patterns formed at a frequency of about 65 GHz.

In an embodiment, in the antenna device in which the radiation guide unit 340 is not implemented, a beam emitted from the radiation member 330 may be dispersed by components (e.g., the printed circuit patterns, the ground unit, and the plurality of via holes included in the board unit 310) acting as reflectors in the board unit 310, resulting in lower directivity in a specific direction (e.g., the end-fire direction). In the antenna device in which the radiation guide unit 340 is implemented, a beam emitted from the radiation member 330 may be directed to a specific direction by the radiation guide unit 340 implemented in the form of a waveguide. Accordingly, in a comparison between FIGS. 7A and 7B, a beam emitted from the radiation member 330 of the antenna device including the radiation guide unit 340 may be further directed in a specific direction (e.g., the direction indicated by the angle 90) (the end-fire direction), compared to a beam emitted from the radiation member 330 of the antenna device in which the radiation guide unit 340 is not implemented. Accordingly, the gain of a signal in the antenna device including the radiation guide unit 340 may be greater than the gain of a signal in the antenna device without the radiation guide unit 340.

In an embodiment, in a comparison between FIGS. 7B and 7C, a beam emitted from the radiation member 330 in the antenna device in which the end portion 341 of the radiation guide unit 340 is implemented in the elliptical shape may be more directed in a specific direction (e.g., the direction indicated by the angle of 90) (the end-fire direction) than a beam emitted from the radiation member 330 in the antenna device in which the end portion of the radiation guide unit 340 is implemented in the planar shape. Accordingly, the gain of a signal in the antenna device in which the end portion of the radiation guide unit 340 is implemented in the elliptical shape may be greater than the gain of a signal in the antenna device in which the end portion of the radiating guide portion 340 is implemented in the planar shape.

Figure 8:
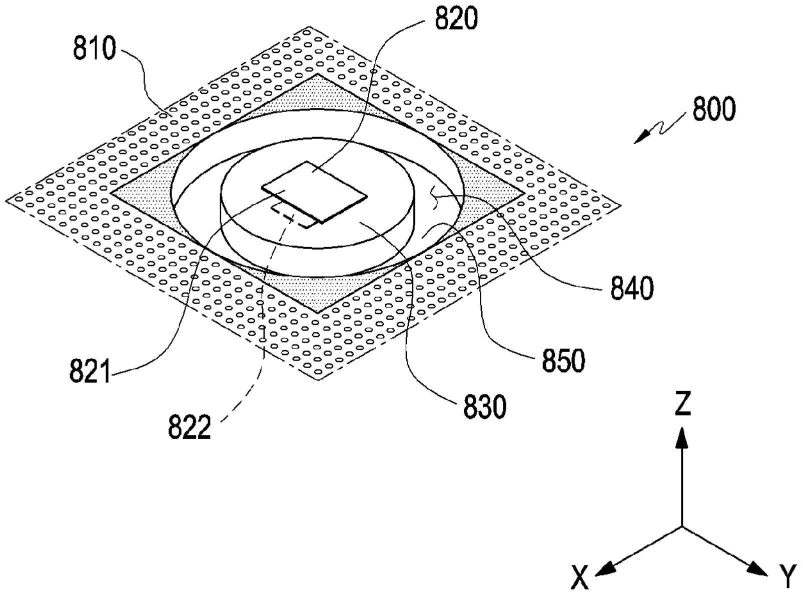
FIG. 8 is a perspective view illustrating an example antenna device according to various embodiments.

FIG. 8 is a perspective view 800 illustrating an antenna device according to various embodiments.

Referring to FIG. 8, in an embodiment, FIG. 8 may be a diagram illustrating a portion of an antenna device.

In an embodiment, the antenna device may include a board unit 810, a radiation member 820, and/or a radiation guide unit 830.

In an embodiment, the board unit 810, which may include a stack of a plurality of layers, may include a flexible PCB and a dielectric substrate. In an embodiment, the plurality of layers included in the board unit 810 may include printed circuit patterns formed of a conductor, a ground unit (e.g., a ground layer 850), and a plurality of via holes formed through front/rear (or top/bottom) surfaces thereof. In an embodiment, the plurality of via holes may be formed to electrically connect printed circuit patterns formed on different layers to each other or for heat dissipation. In an embodiment, while not shown in FIG. 8, the board unit 810 may further include a feeding unit (e.g., a communication circuit or an RF IC), a feeding line transmitting a feed signal from the feeding unit to the radiation member 820, and a ground line providing a ground from the ground unit to the radiation member 820.

In an embodiment, the radiation member 820 (also referred to as a "radiator") may include a first radiation member 821 and a second radiation member 822. In an embodiment, the first radiation member 821 may be configured as a printed circuit pattern on one of the plurality of layers, to emit a beam. In an embodiment, the second radiation member 822 may provide broadband characteristics by implementing a parasitic patch pattern using a printed circuit pattern disposed on a layer spaced apart from the layer on which the first radiation member 821 is implemented.

In an embodiment, the radiation member 820 may be disposed inside the antenna device (e.g., a circuit board). In an embodiment, the radiation member 820 may be disposed on the ground unit (e.g., the ground layer 850) included in the board unit 810.

In an embodiment, the radiation guide unit 830 may be made of a dielectric. In an embodiment, the radiation guide unit 830 may guide a beam emitted from the radiation member 820 to direct the beam in a direction (e.g., in a Z-axis direction) in which a top surface (or bottom surface) of the board unit 810 faces.

In an embodiment, the radiation guide unit 830 may be implemented in the form of a circular waveguide. For example, the radiation guide unit 830 may be implemented as a circular waveguide surrounding at least a portion of the radiation member 820. However, the radiation guide unit 830 may be implemented in various shapes other than the shape of a circular waveguide, and various shapes in which the radiation guide unit 830 may be implemented will be described in greater detail below with reference to FIG. 9.

In an embodiment, the ground layer 850, which is the lowermost layer of the board unit 810, may act as a reflector for a beam emitted from the radiation member 820. In an antenna device in which the radiation guide unit 830 is not implemented, a beam emitted from the radiation member 820 may be dispersed by the ground layer 850 acting as a reflector, resulting in less directivity in a specific direction (e.g., the Z-axis direction). In an embodiment, the radiation guide unit 830 may guide the beam emitted from the radiation member 820 and reflected by the ground layer 850 to be directed in the specific direction (e.g., the Z-axis direction).

In an embodiment, as the radiation guide unit 830 guides the beam emitted from the radiation member 820 to be directed in a specific direction (e.g., in the direction of the top surface of the board unit 810), energy related to the beam radiated from the radiation member 820 may be collected in the specific direction, thereby increasing the gain of a signal and a communication distance.

In an embodiment, as illustrated in FIG. 8, the radiation member 820 (and the radiation guide unit 830) may be spaced apart from the board unit 810 by a specified distance to minimize and/or reduce effects related to radiation performance caused by a component (e.g., printed circuit patterns) included in the board unit 810.

In an embodiment, as illustrated in FIG. 8, reference numeral 840 may indicate an empty space formed by removing a portion of a dielectric through machining (e.g., back-drilling machining) to form the radiation guide unit 830.

Figure 9:
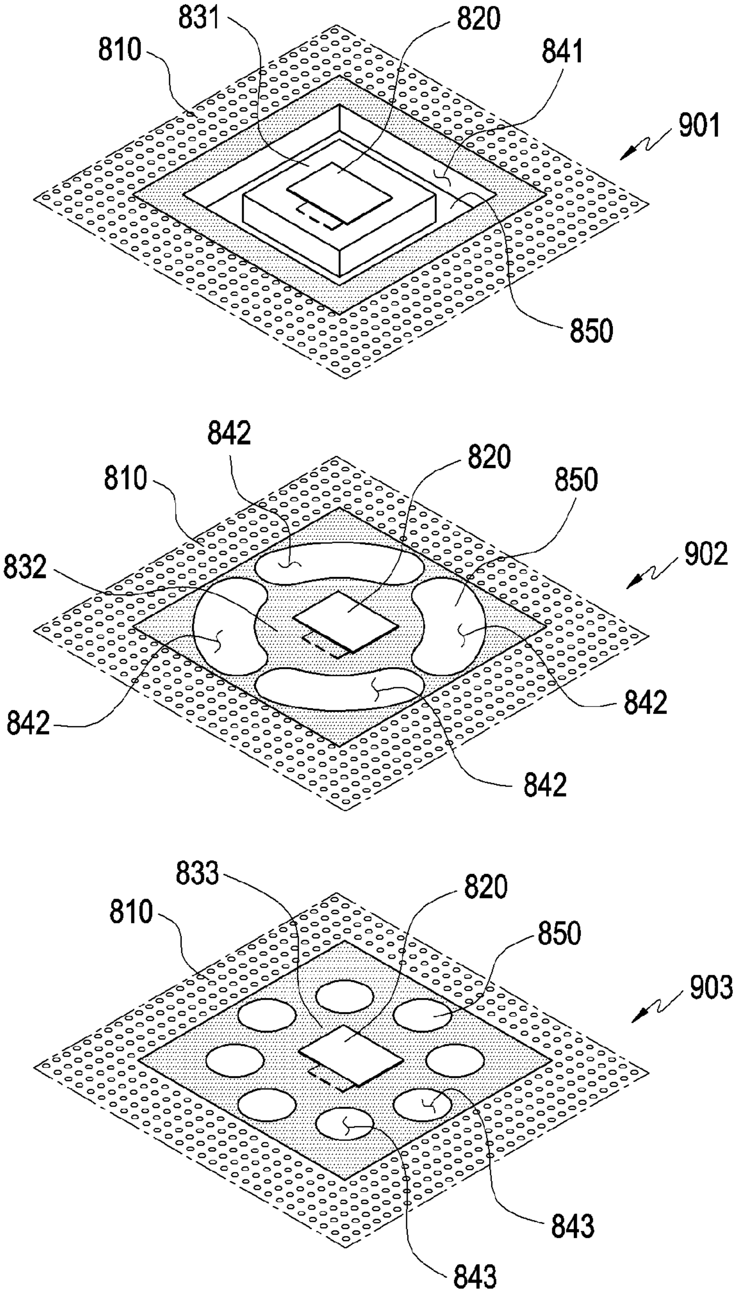
FIG. 9 is a perspective view illustrating various forms of a radiation guide included in an antenna device according to various embodiments.

FIG. 9 includes various perspective views illustrating various forms of radiation guide units included in an antenna device according to various embodiments.

Referring to FIG. 9, in an embodiment, the radiation guide unit may be implemented in various forms other than the circular waveguide form of FIG. 8.

In an embodiment, a radiation guide unit 831 may be implemented in the form of a rectangular waveguide, as indicated by reference numeral 901. In reference numeral 901, reference numeral 841 may indicate an empty space formed by removing a portion of a dielectric through machining (e.g., back-drilling machining) to form the radiation guide unit 831 in the form of a rectangular waveguide.

In an embodiment, a radiation guide unit 832 (e.g., a dielectric portion surrounded by empty spaces 842) may be implemented by forming the elliptical empty spaces 842 by removing a portion of the dielectric through machining (e.g., back-drilling machining), as indicated by reference numeral 902.

In an embodiment, a radiation guide unit 833 (e.g., a dielectric portion surrounded by empty spaces 843 (a portion surrounded by a dotted line in reference numeral 903)) may be implemented by forming the empty spaces 843 in the form of circles by removing a dielectric portion through machining (e.g., back-drilling machining), as indicated by reference numeral 903.

Figure 10:
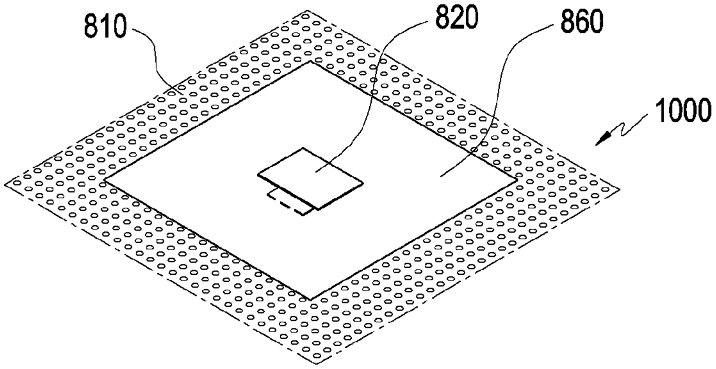
FIG. 10 is a perspective view illustrating an example method of implementing an antenna device according to various embodiments.

FIG. 10 is a perspective view 1000 illustrating an example method of implementing an antenna device according to various embodiments.

Referring to FIGS. 8, 9, and 10, a process of fabricating an antenna device capable of radiating a beam in the direction of the top surface (or bottom surface) of the board unit 810, from a circuit board (e.g., a PCB) will be described.

In an embodiment, a radiation member may be implemented within a dielectric 860 extending from the board unit 810. Since the board unit 810 and the radiation member 820 have been described with reference to FIG. 8, a description of the board unit 810 and the radiation member 820 may not be repeated here.

In an embodiment, a portion of the dielectric 860 may be removed by machining (e.g., back-drilling machining) the dielectric 860. For example, back-drilling machining may be performed on the dielectric 860 to form the radiation guide units illustrated in FIGS. 8 and 9.

In an embodiment, the ground layer 850, which is the lowermost layer of the board unit, may be maintained during the back-drilling machining of the dielectric 860.

Figure 11A:
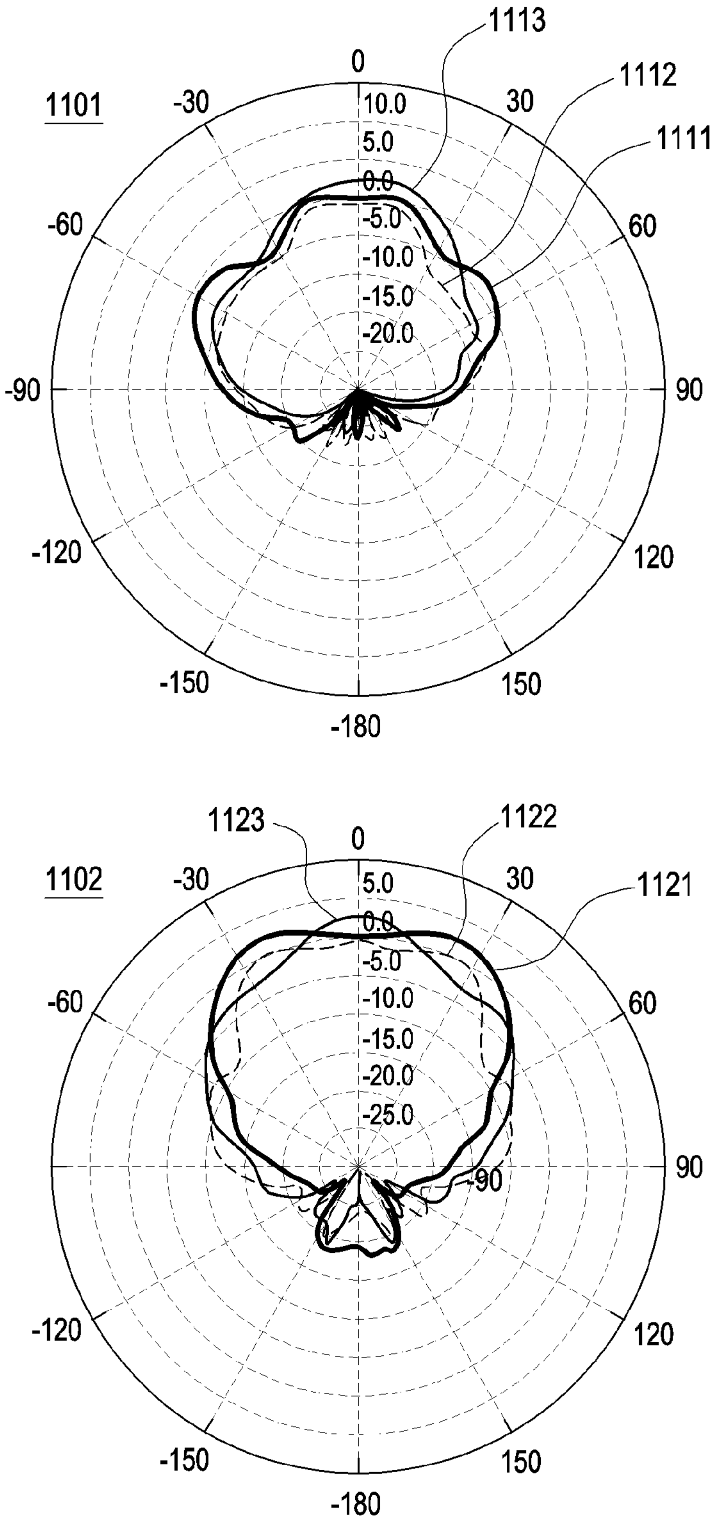
FIGS. 11A and 11B are diagrams illustrating radiation patterns of an antenna device according to various embodiments.
Figure 11B:
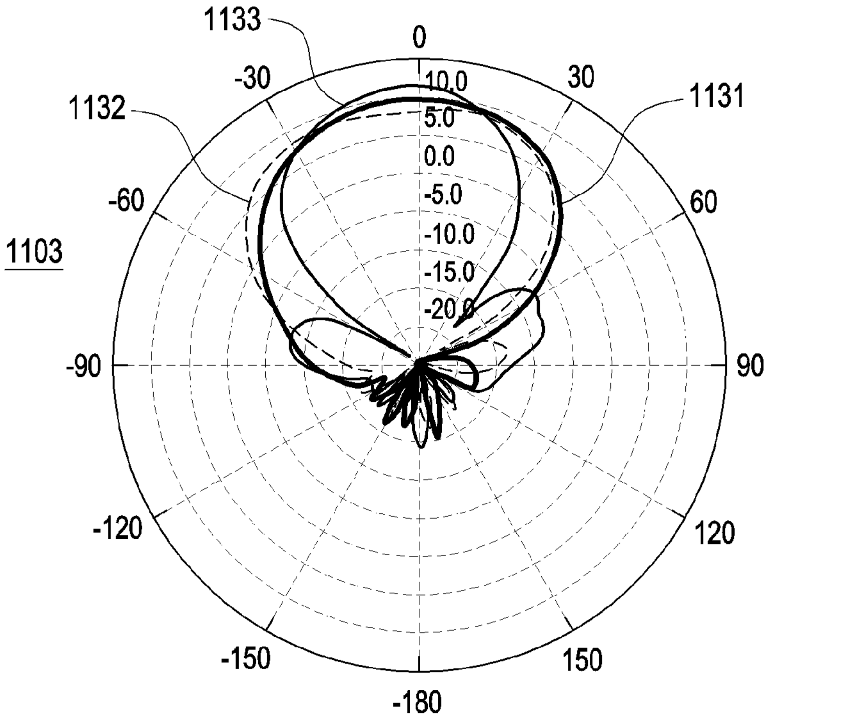
Figure 11B:
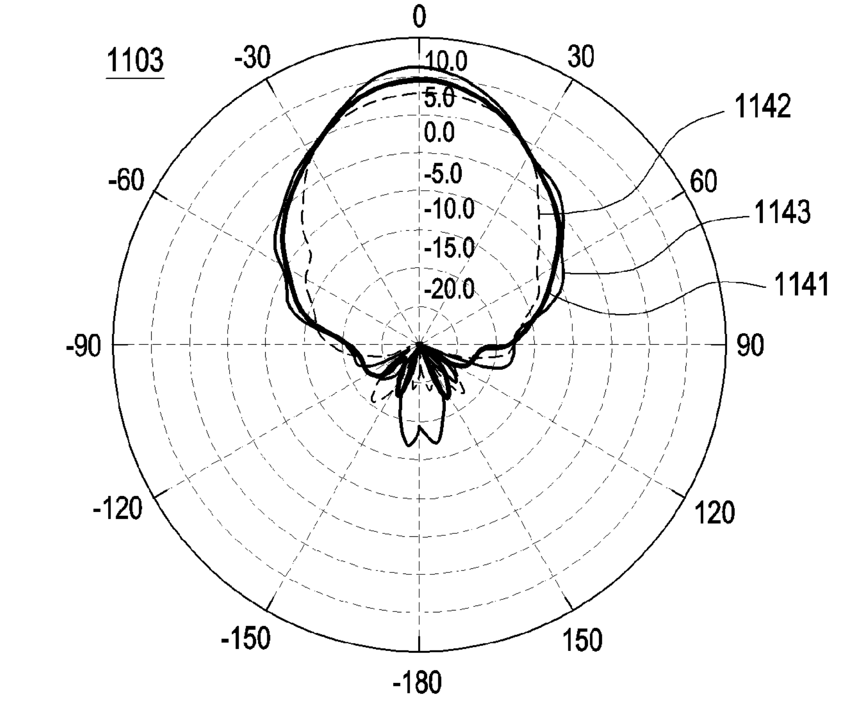

FIGS. 11A and 11B are diagrams illustrating radiation patterns of an antenna device according to various embodiments.

Referring to FIGS. 11A and 11B, in an embodiment, FIG. 11A may illustrate radiation patterns measured in an antenna device in which a radiation guide unit (e.g., the radiation guide unit 830 in FIG. 8) is not implemented. For example, FIG. 11A may illustrate radiation patterns measured in an antenna device in which a radiation guide unit is not implemented, as illustrated in FIG. 10.

In an embodiment, in reference numeral 1101 of FIG. 11A, lines 1111, 1112, and 1113 may represent radiation patterns formed in the horizontal direction of the antenna device (e.g., a direction facing a plane formed by the Y axis and Z axis in FIG. 8). In reference numeral 1101, a direction indicated by an angle of 0 may be the Z-axis direction of FIG. 8 (e.g., the direction of the top surface of the board unit).

In an embodiment, in reference numeral 1102 of FIG. 11A, lines 1121, 1122, and 1123 may represent radiation patterns formed in the vertical direction of the antenna device (e.g., the direction facing the plane formed by the X axis and the Z axis in FIG. 3). In reference numeral 1102, a direction indicated by an angle of 0 may be the Z-axis direction of FIG. 3 (e.g., the direction of the top surface of the board unit).

In an embodiment, the line 1111 and the line 1121 may represent radiation patterns formed at a frequency of about 55 GHz, the line 1112 and the line 1122 may represent radiation patterns formed at a frequency of about 60 GHz, and the line 1113 and the line 1123 may represent radiation patterns formed at a frequency of about 65 GHz.

In an embodiment, FIG. 11B may represent radiation patterns measured in an antenna device in which a radiation guide unit (the radiation guide unit in FIG. 8) is implemented. For example, FIG. 11B may represent radiation patterns measured in an antenna device in which a radiation guide unit is implemented, as in FIG. 8.

In an embodiment, in reference numeral 1103 of FIG. 11B, lines 1131, 1132, and 1133 may represent radiation patterns formed in the horizontal direction of the antenna device (e.g., the direction facing the plane formed by the Y axis and Z axis in FIG. 8). In reference numeral 1103, a direction indicated by an angle of 0 may be the Z-axis direction in FIG. 8 (e.g., the direction of the top surface of the board unit).

In an embodiment, in reference numeral 1104 of FIG. 11B, lines 1141, 1142, and 1143 may represent radiation patterns formed in the vertical direction of the antenna device (e.g., the direction facing the plane formed by the X axis and the Z axis in FIG. 3). In reference numeral 1104, a direction indicated by an angle of 0 may be the Z-axis direction in FIG. 8 (e.g., the direction of the top surface of the board unit).

In an embodiment, the line 1131 and the line 1141 may represent radiation patterns formed at a frequency of about 55 GHz, the line 1132 and the line 1142 may represent radiation patterns formed at a frequency of about 60 GHz, and the line 1133 and the line 1143 may represent radiation patterns formed at a frequency of about 65 GHz.

In an embodiment, in the antenna device in which the radiation guide unit (e.g., the radiation guide unit 830) is not implemented, a beam emitted from the radiation member may be dispersed by the ground layer 850 acting as a reflector, resulting in lower directivity in a specific direction (e.g., the direction of the top surface of the board unit). On the contrary, in the antenna device in which the radiation guide unit is implemented, a beam emitted from the radiation member may be directed in a specific direction by the radiation guide unit implemented in the form of a waveguide. Accordingly, in a comparison between FIGS. 11A and 11B, a beam emitted from the radiation member of the antenna device including the radiation guide unit may be more directed in a specific direction (e.g., the direction indicated by the angle of 0) than a beam emitted from the radiation member of the antenna device without the radiation guide unit. Accordingly, the gain of a signal in the antenna device including the radiation guide unit may be greater than the gain of a signal in the antenna device without the radiation guide unit.

In an embodiment, as the radiation guide unit guides a beam emitted from the radiation member to be directed in a specific direction (e.g., in the direction of the top surface of the board unit), energy related to the beam emitted from the radiation member may be collected in the specific direction, thereby increasing the gain of a signal and a communication distance.

An antenna device according to an example embodiment may include: a board unit including a printed circuit board, the first via pad configured to provide a feed signal to a radiation member comprising a radiator, the second via pad configured to provide a ground to the radiation member, the radiation member connected to the first via pad and the second via pad, and a radiation guide unit formed of a dielectric extending from the board unit in a lateral direction of the board unit, and configured to guide a beam emitted from the radiation member in the lateral direction.

According to an example embodiment, the radiation guide unit may be formed in a form of a waveguide surrounding the radiation member.

According to an example embodiment, an end portion of the radiation guide unit may have a semi-elliptical shape.

According to an example embodiment, the radiation guide unit may be configured to guide a beam reflected by a component included in the board unit in the lateral direction.

According to an example embodiment, a height of the radiation member may be substantially equal to a height of the board unit.

According to an example embodiment, the radiation member may include a folded dipole antenna having an elongated hole formed in the radiation member.

According to an example embodiment, the radiation member may be include a via wall formed in the elongated hole through plating.

According to an example embodiment, the radiation member may be disposed spaced apart from the board unit by a specified distance.

According to an example embodiment, the via hole may be formed between the first via pad and the second via pad.

According to an example embodiment, each of an end portion of the first via pad and an end portion of the second via pad may have a semi-circular shape.

According to an example embodiment, the radiation member may include an antenna configured to support mm-Wave communication.

According to an example embodiment, the board unit may include a dielectric substrate comprising a stack of a plurality of layers, and at least some of the plurality of layers may include a printed circuit pattern comprising a conductor, a ground, and a plurality of via holes.

According to an example embodiment, the dielectric may include an FR4 dielectric.

An antenna device according to an example embodiment may include: a board unit comprising a printed circuit board, a radiation member comprising a radiator, and the radiation guide unit formed of a dielectric extending from the board unit, and configured to guide a beam emitted from the radiation member in a direction in which a top surface or a bottom surface of the board unit faces.

According to an example embodiment, the radiation guide unit may be formed in a form of a circular or rectangular waveguide surrounding at least a portion of the radiation member.

An electronic device according to an example embodiment may include: a wireless communication module comprising wireless communication circuitry (e.g., the communication module 190), configured to support mm-Wave communication, at least one processor comprising processing circuitry, and an antenna device. The antenna device may include a board unit comprising a printed circuit board, a first via pad configured to provide a feed signal to a radiation member comprising a radiator, a second via pad configured to provide a ground to the radiation member, the radiation member being connected to the first via pad and the second via pad, and a radiation guide unit formed of a dielectric extending from the board unit in a lateral direction of the board unit, and configured to guide a beam emitted from the radiation member in the lateral direction.

According to an example embodiment, the radiation guide unit may be formed in a form of a waveguide surrounding the radiation member, and may be configured to guide the beam reflected by a component included in the board unit in the lateral direction.

According to an example embodiment, an end portion of the radiation guide unit may have a concave or convex semi-elliptical shape.

According to an example embodiment, an end portion of the radiation guide unit may be implemented include any other shape, not limited to the semi-elliptical shape.

According to an example embodiment, a height of the radiation member may be substantially equal to a height of the board unit.

According to an example embodiment, the radiation member may include a folded dipole antenna having the elongated hole formed in the radiation member.

While the disclosure has been illustrated and described with reference to various example embodiment, it will be understood that the various example embodiments are intended to be illustrative, not limiting. It will be further understood by those skilled in the art that modifications can be made to the disclosure without departing from the true spirit and full scope of the disclosure, including the appended claims and their equivalents. It will also be understood that any of the embodiment(s) described herein may be used in conjunction with any other embodiment(s) described herein.

What is claimed is:

1. An antenna device comprising:
- a board unit;
- a first pad configured to provide a feed signal to a radiation member;
- a second pad configured to provide a ground to the radiation member;
- the radiation member connected to the first pad and the second pad; and
- a radiation guide unit formed of a dielectric extending from the board unit in a lateral direction of the board unit, and configured to guide a beam emitted from the radiation member in the lateral direction,
- wherein the radiation guide unit comprises a waveguide substantially surrounding the radiation member, and
- wherein an end portion of the radiation guide unit has a semi-elliptical shape.

2. The antenna device of claim 1, wherein the radiation guide unit is configured to guide a beam reflected by a component included in the board unit in the lateral direction.

3. The antenna device of claim 1, wherein a height of the radiation member is substantially equal to a height of the board unit.

4. The antenna device of claim 1, wherein the radiation member includes a folded dipole antenna having an elongated hole.

5. The antenna device of claim 4, wherein the radiation member includes a wall formed in the elongated hole through plating.

6. The antenna device of claim 4, wherein the radiation member is disposed spaced apart from the board unit by a specified distance.

7. The antenna device of claim 4, wherein a via hole is formed between the first pad and the second pad.

8. The antenna device of claim 1, wherein each of an end portion of the first pad and an end portion of the second pad has a semi-circular shape.

9. The antenna device of claim 1, wherein the radiation member includes an antenna configured to support millimeter wave (mm-Wave) communication.

10. The antenna device of claim 1, wherein the board unit includes a dielectric substrate comprising a stack of a plurality of layers, and
- wherein at least some of the plurality of layers include a printed circuit pattern comprising a conductor, a ground, and a plurality of holes.

11. The antenna device of claim 1, wherein the dielectric includes a flame retardant 4 (FR4) dielectric.

12. An electronic device comprising:
- a wireless communication module comprising wireless communication circuitry configured to support millimeter wave communication;
- at least one processor comprising processing circuitry; and
- an antenna device comprising:
  - a board unit;
  - a first pad configured to provide a feed signal to a radiation member, including an antenna;
  - a second pad configured to provide a ground to the radiation member;
  - the radiation member connected to the first pad and the second pad; and
  - a radiation guide unit formed of a dielectric extending from the board unit in a lateral direction of the board unit, and configured to guide a beam emitted from the radiation member in the lateral direction,
- wherein the radiation guide unit is in a form of a waveguide substantially surrounding the radiation member, and
- wherein an end portion of the radiation guide unit has a semi-elliptical shape.

13. The electronic device of claim 12, wherein the radiation guide unit is configured to guide the beam reflected by a component included in the board unit in the lateral direction.

14. The electronic device of claim 13, wherein the semi-elliptical shape includes a concave or convex semi-elliptical shape.

15. The electronic device of claim 12, wherein a height of the radiation member is substantially equal to a height of the board unit.

16. The electronic device of claim 12, wherein the radiation member includes a folded dipole antenna having an elongated hole.

* * * * *